US012604217B2

(12) United States Patent
Kano et al.

(10) Patent No.: US 12,604,217 B2
(45) Date of Patent: Apr. 14, 2026

(54) MOBILE TERMINAL TESTING SYSTEM

(71) Applicant: ANRITSU CORPORATION,
Kanagawa (JP)

(72) Inventors: Daiki Kano, Kanagawa (JP); Nobuaki Shimakawa, Kanagawa (JP)

(73) Assignee: ANRITSU CORPORATION,
Kanagawa (JP)

( * ) Notice: Subject to any disclaimer, the term of this patent is extended or adjusted under 35 U.S.C. 154(b) by 522 days.

(21) Appl. No.: 18/048,634

(22) Filed: Oct. 21, 2022

(65) Prior Publication Data

US 2023/0156494 A1 May 18, 2023

(30) Foreign Application Priority Data

Nov. 18, 2021 (JP) ................................. 2021-187769

(51) Int. Cl.
*H04W 24/06* (2009.01)
(52) U.S. Cl.
CPC .................................. *H04W 24/06* (2013.01)
(58) Field of Classification Search
None
See application file for complete search history.

(56) References Cited

U.S. PATENT DOCUMENTS

2008/0120058 A1* 5/2008 Kim ..................... G06F 11/2236
714/E11.166
2011/0244439 A1* 10/2011 Reed ........................ G09B 7/04
434/350

2013/0290405 A1* 10/2013 Wong ...................... G09G 3/006
709/203
2014/0080424 A1* 3/2014 Aoki ................... H04B 17/0085
455/67.14
2015/0089416 A1* 3/2015 Anderson ............. G06F 3/0484
715/765
2016/0011232 A1* 1/2016 Marques Martins ........................
G01R 1/0416
324/754.03
2016/0270764 A1* 9/2016 Wodecki .............. A61B 8/4405
2016/0352930 A1* 12/2016 Fujita ................. H04N 1/00251
2017/0135015 A1* 5/2017 Yang ............... H04W 36/00837
2019/0020783 A1* 1/2019 Yokoyama ............ H04W 76/10
2019/0271841 A1* 9/2019 Hwang .................. G02C 7/105
(Continued)

FOREIGN PATENT DOCUMENTS

JP 2020-088558 A 6/2020

*Primary Examiner* — Wutchung Chu
*Assistant Examiner* — Berhanu D Belete
(74) *Attorney, Agent, or Firm* — McDonald Hopkins LLC

(57) ABSTRACT

According to the present invention, provided is a mobile terminal testing system that can be easily adding or deleting test functions of another communication standard to or from test functions of a predetermined communication standard. A mobile terminal testing system includes a mobile terminal testing device 1 including an LTE measurement unit 12 which transmits and receives a signal to and from a mobile terminal by LTE, and an NR measurement unit 13 which transmits and receives the signal to and from the mobile terminal by NR, and a personal computer device 2 including an LTE interface unit 22 which controls an interface with a user for LTE, and an NR interface unit 23 which controls an interface with the user for NR, in which the LTE interface unit 22 and the LTE measurement unit 12 transmit and receive information via the NR interface unit 23.

5 Claims, 3 Drawing Sheets

(56)        References Cited

U.S. PATENT DOCUMENTS

| | | | | |
|---|---|---|---|---|
| 2019/0361593 | A1* | 11/2019 | Huang | G06F 21/60 |
| 2020/0107329 | A1* | 4/2020 | Ben Ami | H04L 1/0026 |
| 2020/0169335 | A1* | 5/2020 | Hosoya | H04B 17/0087 |
| 2021/0266766 | A1* | 8/2021 | Kano | H04L 5/0048 |
| 2021/0279267 | A1* | 9/2021 | Zhang | G06F 16/44 |
| 2022/0338004 | A1* | 10/2022 | Shibata | H04W 12/60 |

* cited by examiner

MOBILE TERMINAL TESTING SYSTEM

TECHNICAL FIELD

The present invention relates to a mobile terminal testing system for testing a mobile terminal.

BACKGROUND ART

When a mobile terminal for performing communication while moving, such as a mobile phone or a data communication terminal, is developed, the developed mobile terminal needs to be tested whether or not communication can be normally performed. Therefore, a mobile terminal to be tested is connected to a testing device operated as a pseudo base station that simulates functions of an actual base station to perform communication between the testing device and the mobile terminal, and a test to confirm contents of the communication is performed.

Moreover, in the mobile communication system, a 5th generation (5G) new radio (NR) service, which is a 5G wireless system, has started.

In 5G NR, a 5G line is specialized for user plane (U-Plane: user data signal), and control plane (C-Plane: communication control signal) defines specifications for non-standalone (NSA) that transmits and receives using a long term evolution (LTE) line and stand alone (SA) that operates independently in 5G NR without cooperation with LTE.

Patent Document 1 discloses a mobile terminal testing system for performing a test of NSA with a mobile terminal testing device operated as a base station of LTE and a mobile terminal testing device operated as a base station of NR.

RELATED ART DOCUMENT

Patent Document

[Patent Document 1] JP-A-2020-088558

DISCLOSURE OF THE INVENTION

Problem That the Invention is to Solve

In such a mobile terminal testing system, when the mobile terminal compatible with NSA is tested, the configuration of the testing system becomes large because the mobile terminal testing device operated as the base station of LTE and the mobile terminal testing device operated as the base station of NR are used.

The size of the mobile terminal testing system can be reduced by integrating the mobile terminal testing device operated as the base station of LTE and the mobile terminal testing device operated as the base station of NR. However, development of a new testing device having such a configuration is costly and takes a time to complete the development, resulting in a delay of the test of the mobile terminal.

Moreover, considering adaption to SA in the future, a configuration that can easily adopt SA is desired.

An object of the present invention is to provide a mobile terminal testing system that can be easily adding or deleting test functions for another communication standard to or from test functions for a predetermined communication standard.

Means for Solving the Problem

A mobile terminal testing system according to the present invention includes: a mobile terminal testing device that tests a mobile terminal by simulating a mobile communication base station; and an external device that executes a test by controlling the mobile terminal testing device, in which the external device includes an interface unit of a first communication standard, which controls an interface with a user for the first communication standard, and an interface unit of another communication standard, which controls an interface with the user for the second communication standard, the mobile terminal testing device includes a measurement unit of the first communication standard, which transmits and receives a signal to and from the mobile terminal according to the first communication standard, and a measurement unit of the second communication standard, which transmits and receives the signal to and from the mobile terminal according to the second communication standard, and the interface unit of the second communication standard and the measurement unit of the second communication standard transmit and receive information via the interface unit of the first communication standard.

With this configuration, the interface unit of another communication standard and the measurement unit of another communication standard transmit and receive information via the interface unit of a predetermined communication standard. Therefore, test functions for another communication standard can be easily added to or deleted from the test functions for a predetermined communication standard.

Further, in the mobile terminal testing system according to the present invention, the external device further includes a scenario unit of the second communication standard, which controls the measurement unit of the second communication standard to transmit and receive the signal to and from the mobile terminal by the second communication standard, and the interface unit of the second communication standard and the scenario unit of the second communication standard transmit and receive information via the interface unit of the first communication standard.

With this configuration, the interface unit of another communication standard and the scenario unit of another communication standard transmit and receive information via the interface unit of a predetermined communication standard. Therefore, test functions for another communication standard can be easily added to or deleted from the test functions for a predetermined communication standard.

Further, in the mobile terminal testing system according to the present invention, the first communication standard is a 5th generation (5G) new radio (NR), and the second communication standard is long term evolution (LTE).

Advantage of the Invention

According to the present invention, it is possible to provide a mobile terminal testing system that can be easily adding or deleting functions of a test for another communication standard to or from test functions for a predetermined communication standard.

BEST MODE FOR CARRYING OUT THE
INVENTION

Hereinafter, a mobile terminal testing system according to an embodiment of the present invention will be described in detail with reference to the drawings.

Figure 1:
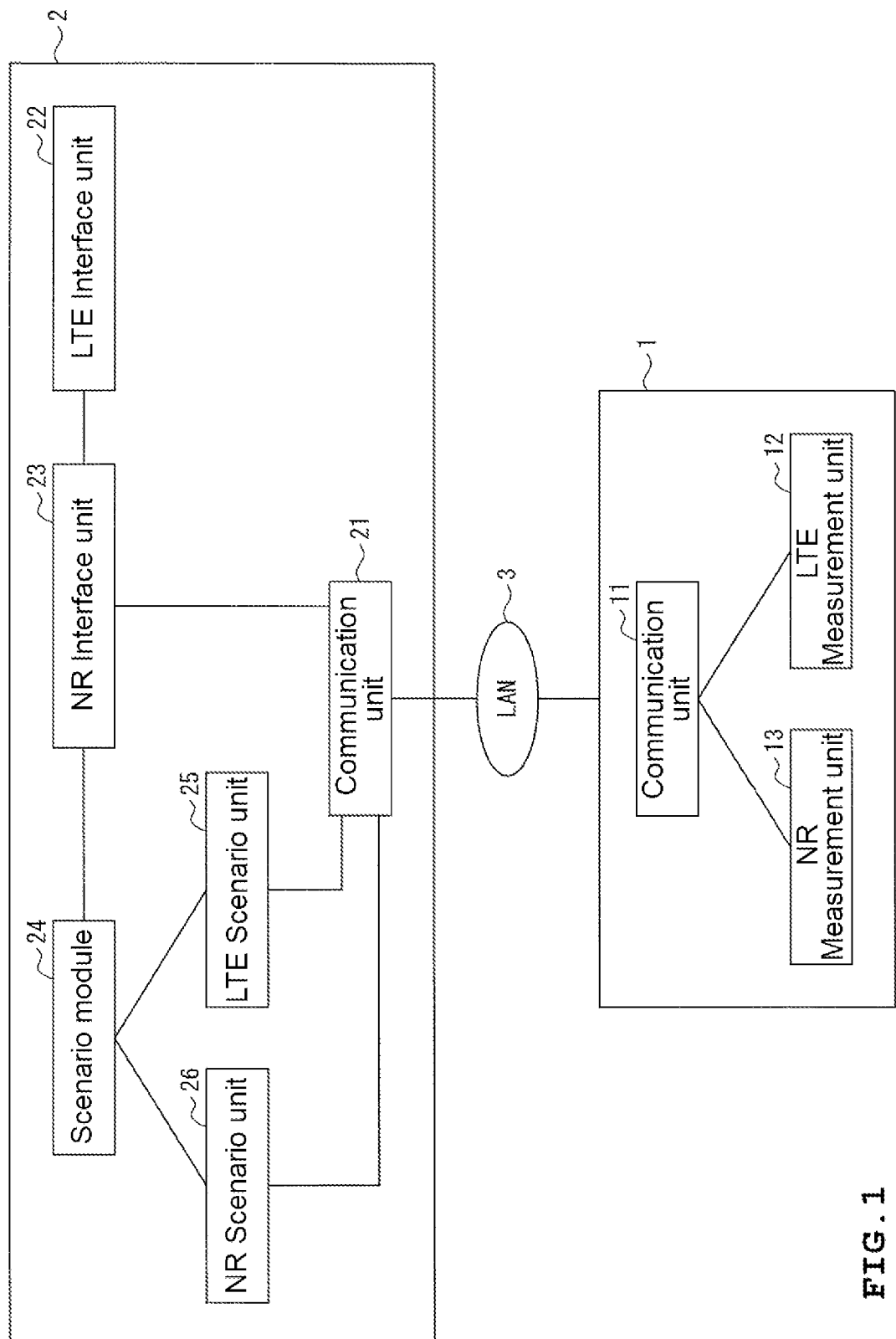
FIG. 1 is a block diagram of a mobile terminal testing system according to an embodiment of the present invention.

In FIG. 1, a mobile terminal testing system according to an embodiment of the present invention includes a mobile terminal testing device 1 and a personal computer device (hereinafter simply referred to as "PC") 2 as an external device.

The mobile terminal testing device 1 is controlled by the PC 2 to test mobile terminals.

The mobile terminal testing device 1 is composed of a computer unit that includes a central processing unit (CPU), a random access memory (RAM), a read only memory (ROM), a flash memory, a hard disk device, an input port, and an output port.

In the computer unit, the CPU executes an operating system (OS) stored in the hard disk device, such that the CPU can control a device connected to the input port and the output port.

The mobile terminal testing device 1 includes a communication unit 11, an LTE measurement unit 12 and an NR measurement unit 13.

The communication unit 11 is composed of a communication module. The communication unit 11 communicates with a PC 2 via a local area network (LAN) 3 conforming to the Ethernet (registered trademark) connected to the input and output port.

The LTE measurement unit 12 transmits and receives a radio frequency (RF) signal of LTE to and from the mobile terminal. The LTE measurement unit 12 measures the RF signal received from the mobile terminal. The LTE measurement unit 12 transmits, to the PC 2, information of the measured result of the RF signal received from the mobile terminal.

The NR measurement unit 13 transmits and receives a radio frequency (RF) signal of NR to and from the mobile terminal. The NR measurement unit 13 measures the RF signal received from the mobile terminal. The NR measurement unit 13 transmits, to the PC 2, information of a measured result of the RF signal received from the mobile terminal.

The PC 2 is composed of a computer unit that includes the CPU, the RAM, the ROM, the flash memory, the hard disk device, the input port, the output port, a display unit, and an operation unit.

The display unit is composed of an image display device such as a liquid crystal display, and displays an image for inputting information necessary for setting the test, an image showing a state during the test, and the like.

The operation unit is composed of input devices such as a keyboard, a mouse, and a touch panel, and outputs information and the like input by an operation to the CPU.

In the computer unit, the CPU executes the OS stored in the hard disk device, such that the CPU can control a device connected to the input port and the output port.

The PC 2 includes a communication unit 21, an LTE interface unit 22, an NR interface unit 23, a scenario module 24, an LTE scenario unit 25, and an NR scenario unit 26.

The communication unit 21 is composed of a communication module. The communication unit 21 communicates with the mobile terminal testing device 1 via the Ethernet (registered trademark) conforming to the LAN 3 connected to the input and output port.

The LTE interface unit 22 controls an interface that allows a user to make settings related to LTE for the test and control execution of the test. The LTE interface unit 22 displays, on the display unit, a setting screen of a pseudo base station or a setting screen of a test procedure that is used in the test to create a scenario for LTE of the test or control the execution of the test, according to the operation input to the operation unit.

The LTE interface unit 22 transmits information on the set scenario to the LTE scenario unit 25 via the NR interface unit 23, and the scenario module 24.

The LTE interface unit 22 transmits and receives the set setting information of the pseudo base station or control information such as start of the measurement of the received signal or the like to and from the LTE measurement unit 12 of the mobile terminal testing device 1 via the NR interface unit 23 and the communication unit 21.

The LTE measurement unit 12 of the mobile terminal testing device 1 sets a base station simulated based on the setting information of the pseudo base station transmitted from the LTE interface unit 22 of the PC 2. For example, the LTE measurement unit 12 measures the received signal based on the control information transmitted from the LTE interface unit 22 of the PC 2, and transmits the measured result to the PC 2 via the communication unit 11.

The NR interface unit 23 controls an interface that allows a user to make settings related to NR for the test and control execution of the test. The NR interface unit 23 displays, on the display unit, a setting screen of a pseudo base station or a setting screen of a test procedure that is used in the test to create an LTE scenario for NR of the test or control the execution of the test, according to the operation input to the operation unit.

The NR interface unit 23 transmits information on the set scenario to the NR scenario unit 26 via the scenario module 24.

The NR interface unit 23 transmits the set setting information of the pseudo base station or control information such as start of the measurement of the received signal or the like to the NR measurement unit 13 of the mobile terminal testing device 1 via the communication unit 21.

The NR measurement unit 13 of the mobile terminal testing device 1 sets a base station simulated based on the setting information of the pseudo base station transmitted from the NR interface unit 23 of the PC 2. For example, the NR measurement unit 13 measures the received signal based on the control information transmitted from the NR interface unit 23 of the PC 2, and transmits the measured result to the PC 2 via the communication unit 11.

The scenario module 24 distributes information on the scenario transmitted from the LTE interface unit 22 and the NR interface unit 23 to the LTE scenario unit 25 or the NR scenario unit 26.

The LTE scenario unit 25 transmits information to the LTE measurement unit 12 of the mobile terminal testing device 1 via the communication unit 21 in order to execute each procedure of the test according to the scenario for LTE, in response to an instruction from the LTE interface unit 22, and controls the LTE measurement unit 12.

The NR scenario unit 26 transmits information to the NR measurement unit 13 of the mobile terminal testing device 1 via the communication unit 21 in order to execute each procedure of the test according to the scenario for NR, in response to an instruction from the NR interface unit 23, and controls the NR measurement unit 13.

Figure 2:
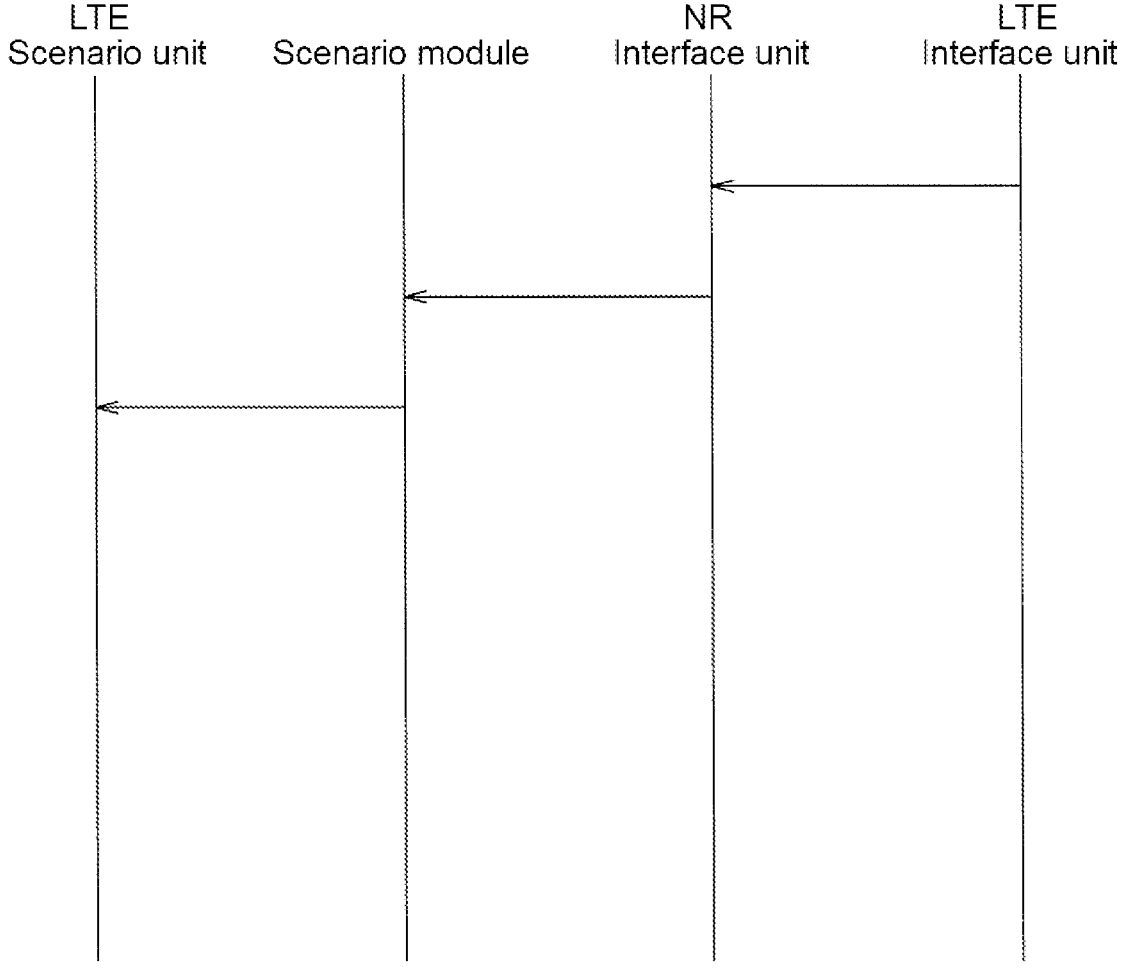
FIG. 2 is a sequence diagram illustrating a transmission sequence of information or control instructions from an LTE interface unit to an LTE scenario unit of the mobile terminal testing system according to an embodiment of the present invention.

In the present embodiment, the information or control instructions from the LTE interface unit 22 to the LTE scenario unit 25 are transmitted via the NR interface unit 23 and the scenario module 24, as illustrated in FIG. 2.

Figure 3:
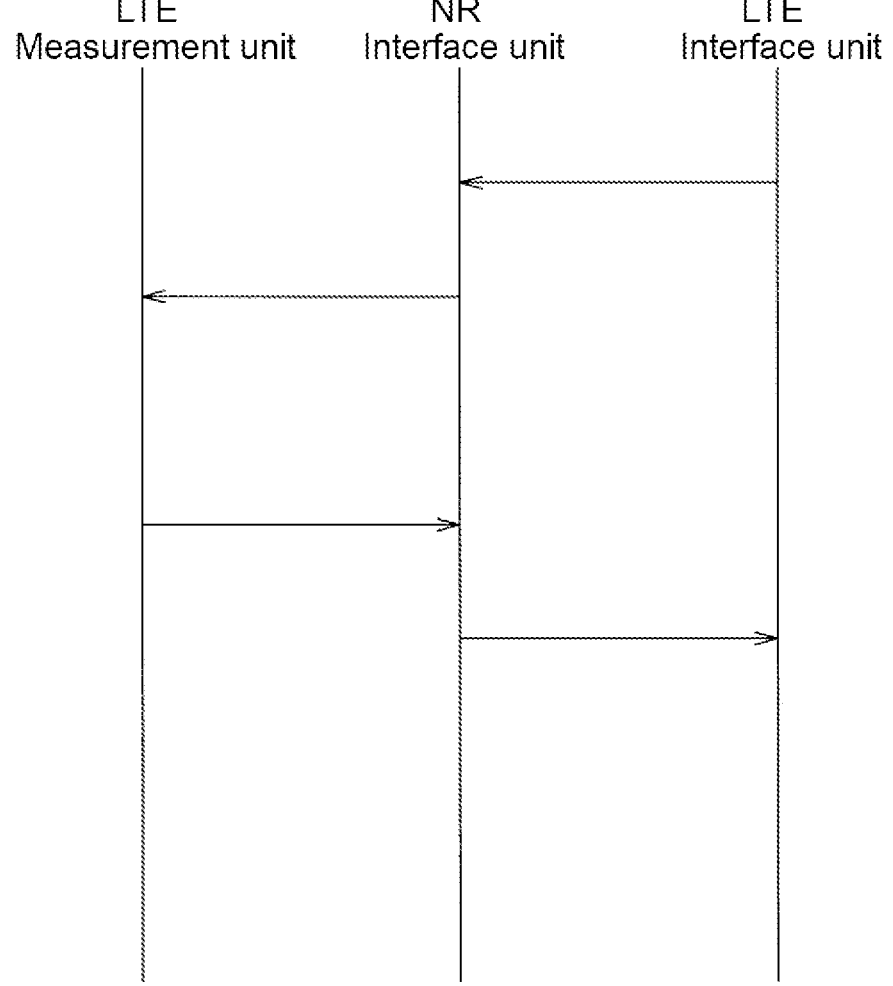
FIG. 3 is a sequence diagram illustrating a transmission and reception sequence of information or control instructions of the LTE interface unit and the LTE measurement unit of a mobile terminal testing device in the mobile terminal testing system according to an embodiment of the present invention.

Moreover, the information or control instructions of the LTE interface unit 22 and the LTE measurement unit 12 of the mobile terminal testing device 1 are transmitted and received via the NR interface unit 23, as illustrated in FIG. 3.

With such a configuration, LTE functions of the LTE interface unit 22, the LTE scenario unit 25, and the LTE measurement unit 12 are added to NR test functions of the NR interface unit 23, the scenario module 24, the NR scenario unit 26, and the NR measurement unit 13, such that it is possible to correspond to the test of NSA.

Moreover, it is possible to correspond to the test of SA only with the configuration of the NR interface unit 23, the scenario module 24, the NR scenario unit 26, and the NR measurement unit 13.

Moreover, development costs and development time can be reduced as long as the LTE interface unit 22, the LTE scenario unit 25, and the LTE measurement unit 12 can be used from the existing testing device of LTE.

In the present embodiment, a configuration in which the mobile terminal testing device 1 is controlled from the PC 2 is shown, but the present embodiment is not limited thereto. Similarly, a configuration in which the mobile terminal testing device 1 is integrated with the PC 2 can be also implemented.

Although the embodiment of the present invention has been disclosed, it is apparent that those skilled in the art could have made changes without departing from the scope of this invention. It is intended that any and all such modifications and equivalents are involved in the appended claims.

DESCRIPTION OF REFERENCE NUMERALS AND SIGNS

1 Mobile terminal testing device
2 Personal computer device (external device)
12 LTE measurement unit (measurement unit for another communication standard)
13 NR measurement unit (measurement unit for predetermined communication standard)
22 LTE interface unit (interface unit for another communication standard)
23 NR interface unit (interface unit for predetermined communication standard)
24 Scenario module
25 LTE scenario unit (scenario unit for another communication standard)
26 NR scenario unit (scenario unit for predetermined communication standard)

What is claimed is:

1. A mobile terminal testing system comprising:
a mobile terminal testing device that tests a mobile terminal by simulating a mobile communication base station; and
an external device that executes a test by controlling the mobile terminal testing device,
wherein the external device is a single computing device that includes a first interface unit of a first communication standard, which controls an interface with a user for the first communication standard, and a second interface unit of a second communication standard, which controls an interface with the user for the second communication standard,
wherein the mobile terminal testing device includes a measurement unit of the first communication standard, which transmits and receives a signal to and from the mobile terminal according to the first communication standard, and a measurement unit of the second communication standard, which transmits and receives the signal to and from the mobile terminal according to the second communication standard,
wherein the interface unit of the second communication standard and the measurement unit of the second communication standard transmit and receive information via the interface unit of the first communication standard,
wherein the external device further includes a scenario unit of the first communication standard, which controls the measurement unit of the first communication standard to transmit and receive the signal to and from the mobile terminal by the first communication standard, and a scenario unit of the second communication standard, which controls the measurement unit of the second communication standard to transmit and receive the signal to and from the mobile terminal by the second communication standard, the measurement units being controlled according to a test scenario, and
wherein the external device further includes a scenario module, which distributes information about the test scenario transmitted from the first interface unit and the second interface unit to the first scenario unit or the second scenario unit.

2. The mobile terminal testing system according to claim 1, wherein the interface unit of the second communication standard and the scenario unit of the second communication standard transmit and receive the information via the interface unit of the first communication standard.

3. The mobile terminal testing system according to claim 1, wherein the first communication standard is a 5th generation (5G) new radio (NR), and the second communication standard is long term evolution (LTE).

4. The mobile terminal testing system according to claim 1, further comprising a single display for interaction with the first interface and the second interface.

5. The mobile terminal testing system according to claim 1, wherein the external device is configured to generate a signal according to the first communication standard and a signal according to the second communication standard.

\* \* \* \* \*